United States Patent
Piffaretti

(12) 
(10) Patent No.: US 6,381,010 B1
(45) Date of Patent: Apr. 30, 2002

(54) METHOD OF DETERMINING A CHARACTERISTIC OF AN OPTICAL FIBER BY REFLECTOMETRY

(75) Inventor: José G. Piffaretti, Conover, NC (US)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/484,029

(22) Filed: Jan. 18, 2000

(30) Foreign Application Priority Data

Jan. 28, 1999 (FR) .............................. 99 00937

(51) Int. Cl.⁷ .............................................. G01N 21/00
(52) U.S. Cl. ................................................ 356/73.1
(58) Field of Search .......................... 356/73.1; 385/16, 385/100, 12, 13; 250/227.11, 227.17, 227.15

(56) References Cited

U.S. PATENT DOCUMENTS

| | | |
|---|---|---|
| 5,053,775 A | 10/1991 | Mawhinney et al. |
| 5,455,672 A | 10/1995 | Lamonde et al. |
| 5,530,546 A * | 6/1996 | Barringer et al. .......... 356/73.1 |
| 5,724,126 A | 3/1998 | Nishi et al. |
| 5,742,722 A | 4/1998 | Imoto |
| 5,778,114 A * | 7/1998 | Eslambolchi et al. ......... 385/12 |

FOREIGN PATENT DOCUMENTS

| | | |
|---|---|---|
| EP | 0 591 818 A1 | 4/1994 |
| FR | 2 597 986 A1 | 10/1987 |
| JP | 05 040 074 | 2/1993 |

* cited by examiner

*Primary Examiner*—Frank G. Font
*Assistant Examiner*—Tu T Nguyen
(74) *Attorney, Agent, or Firm*—Sughrue Mion, PLLC

(57) ABSTRACT

The invention relates to a method of determining at least one characteristic of an optical fiber with the aid of a reflectometer, in which method the fiber to be characterized is connected at both ends to reference fibers and a reflectometer measurement is performed for each reference fiber. To determine if reflectometer data relating to the fiber to be characterized obtained after the two measurements is correct, reflectometer data corresponding to two equivalent points of the reference fibers is compared. The reflectometer data of the fiber to be characterized is retained only if the difference between the data compared is the same for both measurements. The reflectometer data compared for the two reference fibers consists of mean values for equivalent segments, for example.

13 Claims, 1 Drawing Sheet

METHOD OF DETERMINING A CHARACTERISTIC OF AN OPTICAL FIBER BY REFLECTOMETRY

BACKGROUND OF THE INVENTION

1. Field of the Invention

The invention relates to a method of determining a characteristic of an optical fiber by reflectometry.

2. Description of the Prior Art

The bit rate at which information is transmitted by telecommunication networks is continually increasing. Such networks are therefore using increasing quantities of optical fibers able to satisfy this demand for high bit rates.

The characteristics of each optical fiber fabricated must be verified to assure that they conform to the specifications. This entails various types of measurement effected using various systems and necessitating many manipulations of the fiber. Clearly it would be preferable to have measuring systems simultaneously supplying reliable results for the greatest possible number of characteristics.

The systems most widely used consist of reflectometers or backscattering measuring systems. They are used to determine the attenuation of monomode fibers and their mode diameter. The mode diameter represents the diameter of a cylinder within which most of the energy propagates.

Reflectometry is based on the fact that an optical fiber diffuses light in all directions, including backwards. Thus a light pulse of power $P_0$ emitted at time $t=0$ at one end of the fiber travels a distance L in a time $t_1$, and at the end of this time $t_1$ its power is $P_0 e^{-\alpha L}$, and at the end of a time $2t_1$ a pulse of power $\eta P_0 e^{-2\alpha L}$ is collected at the same end of the fiber, where $\alpha$ is the attenuation of the fiber and $\eta$ is its backscattering factor.

The backscattering factor is (among other things) inversely proportional to the square $w^2$ of the mode diameter w.

To perform the measurement, the first end of the fiber to be characterized is connected to a first reference fiber (or standard fiber) and the second end of the fiber to be characterized is then likewise connected to a second reference fiber.

The power is measured at the free ends of the reference fibers. Each measurement entails determining the value of the backscattered power at various points on the fiber to be characterized and the reference fibers. One measurement is performed from the free end of the first standard fiber and another measurement is performed from the free end of the other standard fiber. For example, the mode diameter is determined by representing the two measurements so that the abscissae L have the same origin in both cases and by considering the sum of the logarithms of the backscattered powers at each point. At a given point with abscissa x, one measurement supplies $\eta P_0 e^{-2\alpha x}$ and the other measurement supplies $\eta P_0 e^{-2\alpha(L_1-x)}$, where $L_1$ is the sum of the lengths of the reference fibers and the fiber to be characterized. It is found that the sum of the logarithms is independent of the abscissa x.

The above measurement process is particularly efficient. However, it is highly sensitive to misalignments between the reference fibers and the fiber to be characterized. This is because the small diameters of monomode fibers makes them very difficult to manipulate and align. Also, vibrations at the splices cause measurement errors. To solve these problems a plurality of measurements is taken. However, this solution is clearly not satisfactory because it is time-consuming and is therefore costly in terms of labor.

The invention solves these problems.

SUMMARY OF THE INVENTION

The invention provides a method of determining at least one characteristic of an optical fiber using a reflectometer, wherein the fiber to be characterized is connected at both ends to reference fibers, a first reflectometry measurement is performed using the first reference fiber and a second reflectometry measurement is performed using the second reference fiber, to determine if the reflectometer data relating to the fiber to be characterized obtained after the above two measurements is correct or not a reflectometer data value at one point at least of the first reference fiber is compared to a reflectometer data value at one equivalent point at least of the second reference fiber and the reflectometer data for the fiber to be characterized is retained only if the difference between the compared data values is the same for both measurements.

In the preferred embodiment of the invention, the compared reflectometric data values of the two reference fibers are mean values for the same lengths of the reference fibers.

More generally, the compared reflectometric data values of the two reference fibers are mean values for equivalent segments of the reference fibers and two segments are equivalent if they consist of a set of equivalent points.

This method is particularly simple, quick and reliable, in particular when the reflectometric data concerned is obtained by adding the power detected during the first measurement and the power detected during the second measurement logarithmically for each abscissa, the length origins being the same for both measurements.

In one embodiment of the invention the reference fibers have practically identical characteristics.

The reflectometric data is used to determine the mode diameter of the fiber to be characterized, for example.

The reflectometric data can also be used to determine the chromatic dispersion of the optical fiber from reflectometric data obtained at two wavelengths at least.

In one embodiment of the invention the chromatic dispersion is obtained from the following equation:

$$D(\lambda) = C_0(\lambda) + \sum_i C_i(\lambda) \cdot x(\lambda i),$$

in which $D(\lambda)$ is the chromatic dispersion at the wavelength $\lambda$, $x(\lambda_i)$ is a reflectometric data value corresponding to a measurement at a wavelength $\lambda_i$ and $C_0(\lambda)$ and $C_i(\lambda)$ are coefficients dependent on the wavelength $\lambda$.

The coefficients $C_0$ and $C_i$ are obtained empirically, for example.

In one variant of this latter embodiment, the coefficients $C_0$ and $C_i$ are obtained by means of a plurality of preliminary measurements performed on a series of fibers using chromatic dispersion measuring systems and a reflectometer, the coefficients $C_0$ and $C_i$ being thereafter determined from those measurements by linear regression.

In one embodiment of the invention $x(\lambda_i)$ has the following value:

$$x(\lambda_i) = (y_m - y_A)\lambda_i,$$

in which equation $y_m$ is a mean reflectometric data value at the wavelength $\lambda_i$ of the fiber to be characterized and $y_A$ is the same mean reflectometric data value at the same wavelength $\lambda_i$ for a reference fiber.

In another embodiment of the invention $x(\lambda_i)$ has the value:

$$x(\lambda i) = \frac{L_{fopt(\lambda i)} - L_{fopt(\lambda 0)}}{L_{fopt(\lambda 0)}}$$

where $\lambda_i$ is the measurement wavelength and $L_{opt(\lambda i)}$ is an optical length such that:

$$L_{opt}(\lambda_i) = \frac{c}{2n_{ref}} T(\lambda_i)$$

$$L_{fopt(\lambda i)} = L_{opt(\lambda i)} - L_{0opt(\lambda i)}.$$

where c is the speed of light, $n_{ref}$ is the reference refractive index of the fiber to be characterized, $T(\lambda_i)$ is the transit time, measured by reflectometry, corresponding to twice the transit time between one end of a reference fiber and the end of the other reference fiber, and $L_{0opt(\lambda i)}$ is the optical length of the reference fibers at the wavelength $\lambda_i$.

The transit time $T(\lambda_i)$ can be determined by seeking the maximum correlation between the reflectometric signature observed for the end of the other fiber and the expected signature for that end.

For example, the maximum correlation is sought in incremental reflectometric data between consecutive data points, preferably expressed on a linear scale.

Other features and advantages of the invention will become apparent from the description of embodiments of the invention given with reference to the accompanying drawings.

DETAILED DESCRIPTION OF THE PREFERRED EMBODIMENTS

A first aspect of the invention consists in a method of reliably determining when a measurement on an optical fiber effected by means of a reflectometer (sometimes also referred to as a backscattering measuring system) has been disrupted or not by a defect at the splice(s) between the fiber to be characterized and the reference fibers connected to the ends thereof.

A second aspect of the invention (which can be used independently of the first aspect) concerns a method of determining chromatic dispersion using a reflectometer or backscattering measuring system.

The first aspect of the invention will be described first with reference to FIGS. 1 to 3.

Figure 1:
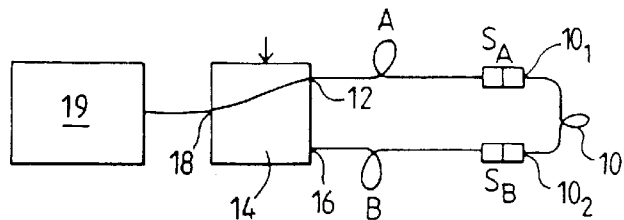
FIG. 1 is a diagram of a reflectometer used to implement a method in accordance with the invention.

FIG. 1 shows a diagram of a backscattering measuring system used to determine the parameters of an optical fiber 10, in particular the mode diameter, the attenuation coefficient and the chromatic dispersion.

The principle of this kind of measurement is as follows:

Inevitable imperfections of optical fibers cause diffusion of the light energy in all directions. A light pulse which is emitted at a particular time at one end of the fiber therefore causes backscattering as it propagates in the fiber and this backscattering can be detected at the same end. If at time t=0 a pulse is emitted with an energy $P_0$, at the end of a time t the pulse has traveled a distance z in the fiber. At the end of this time t the energy backscattered at the distance z is $\eta P_0 e^{-\alpha z}$, where $\alpha$ is the attenuation coefficient of the fiber. The amount of energy captured at time 2t at the end concerned is therefore $\eta P_0 e^{-2\alpha z}$.

The backscattering factor $\eta$ is inversely proportional to the square $w^2$ of the mode diameter w of the optical fiber.

Reference fibers (standard fibers) whose mode diameter W is known are used to measure the mode diameter of the fiber 10.

A reference fiber A is therefore connected at a splice $S_A$ to the end $10_1$ of the fiber to be characterized. A second reference fiber B is connected at a splice $S_B$ to the end $10_2$. The splices $S_A$ and $S_B$ are effected with the aid of alignment grooves, for example.

The free end of the reference fiber A is connected to a first terminal 12 of an optical switch 14. A second terminal 16 of the optical switch 14 is connected to the free end of the reference fiber B.

A third (common) terminal 18 of the switch 14 is connected to a system 19 for generating laser pulses and measuring the backscattered energy. The switch 14 connects the terminal 18 either to the terminal 12 or to the terminal 16.

To characterize the mode diameter of a the fiber 10 a backscattering measurement is performed for at least one wavelength at the end of the reference fiber A and at the end of the reference fiber B. To this end, the switch 14 connects the terminal 18 to the terminal 12 for the first measurement and to the terminal 16 for the second measurement.

Figures 2A, 2B:
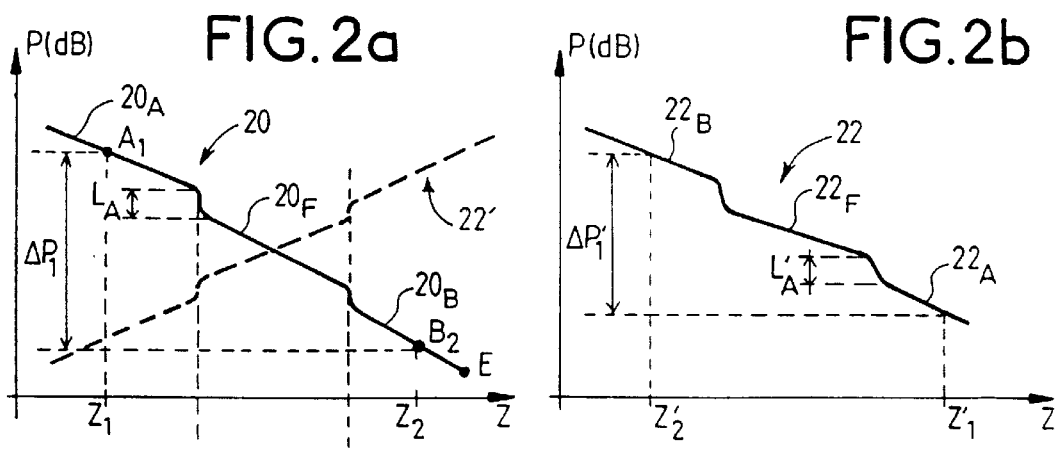
FIGS. 2a and 2b are diagrams showing steps of a mode diameter determination method.

The diagram in FIG. 2a represents the backscattering curve 20 when the system 19 is connected to the end of the reference fiber A. In this diagram the length Z in kilometers is plotted on the abscissa axis and the backscattered power in dB is plotted on the ordinate axis. The curve 20 has a first part $20_A$ corresponding to the reference fiber A, a second part $20_F$ corresponding to the fiber 10 and a third part $20_B$ corresponding to the second reference fiber B. The curve has a discontinuity between the parts $20_A$ and $20_F$ corresponding to a loss $L_A$ in the splice $S_A$. Similarly, the curve 20 has a discontinuity between the sections $20_F$ and $20_B$ corresponding to a loss in the splice $S_B$.

FIG. 2b is a diagram similar to that of FIG. 2a and shows a backscattering measurement effected when the switch 14 is in the second position, i.e. when the end of the reference fiber B is connected to the measurement system 19. In this case, the backscattering curve 22 has a first part $22_B$ corresponding to the reference fiber B, a second part $22_F$ corresponding to the fiber 10 to be characterized, and a third part $22_A$ corresponding to the reference fiber A. The curve 22 also has discontinuities at the splices between the sections $22_B$ and $22_F$ and between the sections $22_F$ and $22_A$. The first discontinuity corresponds to the splice $S_B$ and the second discontinuity to the splice $S_A$. $L'_A$ is the power loss in the splice $S_A$.

The mode diameter of the fiber 10 at each wavelength $\lambda_i$ is determined from the values of $L_A$, $L'_A$ and $W_A$, where $W_A$ is the known mode diameter of the reference fiber A.

To this end, the difference $\Delta L$ between $L_A$ and $L'_A$ is determined:

$$\Delta L(\lambda_i) = L_A(\lambda_i) - L'_A(\lambda_i) \quad (1)$$

The mode diameter of the fiber 10 at the wavelength $\lambda_i$ then has the following value:

$$W_S(\lambda_j) = W_A(\lambda_j) \cdot 10^{\frac{gj\Delta L(\lambda_j)+fj}{20}} \quad (2)$$

The values of gj and fj can be determined experimentally. They are sometimes set at 1 and 0, respectively. In this case, the above equation (2) becomes:

$$W_S(\lambda_j) = W_A(\lambda_j) \cdot 10^{\frac{\Delta L(\lambda_j)}{20}} \quad (2')$$

The measured values of $L_A$ and $L'_A$ can be subject to errors because the values of $L_A$ and $L'_A$ are greatly influenced by the quality of the splices $S_A$ and $S_B$. This is because the diameter of the fibers is in the order of a few microns and so the splices are not always perfect or perfectly immobile.

Given that the accuracy required for the values of $L_A$ and $L'_A$ is less than 1/100 decibel, it is generally necessary, if this accuracy is to be obtained, to carry out a plurality of measurements for each fiber and each wavelength and to compare the various measurements in order to determine which ones are meaningful.

The invention determines quickly if a measurement is correct or not.

The invention is based on the fact that the sections $20_A$ and $20_B$ of the curve 20 and the sections $22_B$ and $22_A$ of the curve 22 are known. A point $A_1$ at abscissa $z_1$ in the fiber A and an analogous (equivalent) point $B_2$ at abscissa $z_2$ of the fiber B are therefore considered. The expression "analogous point" means a point whose distance from the splice $S_B$ is the same as the distance from the point $A_1$ to the splice $S_A$. The difference $P_{A1}-P_{B2}=\Delta P_1$ depends on the losses between the abscissae $z_1$ and $z_2$ but not on the direction in which the light travels.

Accordingly, to verify if a measurement is correct, $\Delta P_1$ (FIG. 2a) and $\Delta P'_1$ (FIG. 2b) are determined and their values are compared.

If the values $\Delta P_1$ and $\Delta P'_1$ are equal, to within the permitted tolerance, the measurement is correct and it is not necessary to perform another measurement. However, if the values $\Delta P_1$ and $\Delta P'_1$ are different, the measurement is not valid and another measurement is performed.

In a preferred embodiment of the invention the reflectometry measurements of the mode diameter in particular are effected in the following manner:

The results of the measurements which correspond to FIG. 2b, i.e. the results of the measurements using the reference fiber B, are plotted on the same diagram as the results of the measurements using the reference fiber A (FIG. 2a). However, the results of the measurements using the reference fiber B (with the optical switch 14 connecting the terminals 18 and 16) are plotted on a diagram for which the origins are the same, i.e. the curve 22' (in dashed line in FIG. 2a) corresponds to a measurement from end B and the origin of the abscissae z is (for example) the terminal 12 (which is its free end opposite the laser source in this measurement). The curve 22' is therefore similar to the curve 22, but has the reverse slope.

Figure 3:
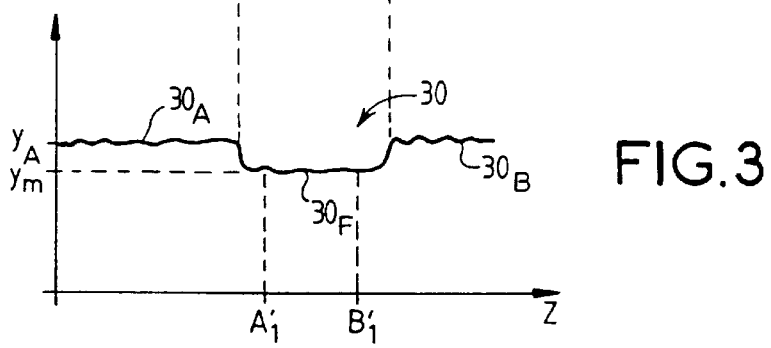
FIG. 3 is a diagram illustrating one aspect of a method in accordance with the invention.

The values $y_1$ corresponding to the curve 20 and $y_2$ corresponding to the curve 22' are summed point by point to obtain the curve 30 shown in the FIG. 3 diagram. It is important to note that $y_1$ and $y_2$ are expressed in dB, i.e. on a logarithmic scale.

The curve 30 has three sections $30_A$, $30_F$ and $30_B$ respectively corresponding to the reference fiber A, the fiber 10 to be characterized and the reference fiber B. The sections corresponding to the reference fibers A and B are substantially horizontal, i.e. the values $y=y_1+y_2$ are substantially constant for these sections.

If the reference fibers A and B are identical, for example obtained by cutting a homogeneous fiber in two, the values for the sections $30_A$ and $30_B$ will be the same.

To ensure that the data supplied by the reflectometer is correct, the sections $30_A$ and $30_B$ are compared. If the reference fibers A and B are identical, the mean values $y=y_1+y_2$ will be the same for the two sections. If the reference fibers A and B are not identical, the difference between the mean values y for each of the two sections has a non-zero value but this value is known in advance.

If comparing the sections $30_A$ and $30_B$ gives the expected results, the curves 20, 22 and 30 are correct, the measurements are retained and it is not necessary to perform an additional measurement. However, if comparing the sections $30_A$ and $30_B$ yields a result different from the expected result, the measurement is incorrect and must be done again.

In practice the sections $30_A$ and $30_B$ do not supply values which are strictly constant. Under these conditions, a mean is calculated for y over parts of the sections $30_A$ and $30_B$ which correspond to the same length and which are similarly situated relative to the corresponding splice. For example, the sections $30_A$ and $30_B$ are considered over a common length $d_1$ starting at the same distance d from the splices $S_A$ and $S_B$.

The above method of determining the reliability of a reflectometry measurement is useful not only for determining the mode diameter but also for determining characteristics deduced from reflectometer measurements. In particular, as described below, the chromatic dispersion of optical fibers can be determined using data supplied by a reflectometer.

Chromatic dispersion reflects the fact that the refractive index of the material of the fiber, which is usually doped silica, depends on the wavelength of the light. The dispersion D is expressed in picoseconds (widening of the pulses) per nanometer (corresponding to a source bandwidth) and per kilometer (length of fiber).

A chromatic dispersion D therefore signifies that, at the wavelength concerned, a pulse will be widened by D picoseconds for a source bandwidth of 1 nanometer per kilometer of optical fiber.

The chromatic dispersion at a particular wavelength is in fact defined as the slope at that wavelength of the curve of the variation in the transit time per kilometer as a function of the wavelength.

To determine the chromatic dispersion transit times (travel durations) of light pulses in the fiber are therefore usually measured at various wavelengths, for example from 1.2 μm to 1.55 μm. The transit time is the time for the light pulse to travel from one end of the fiber to the other.

Figure 4:
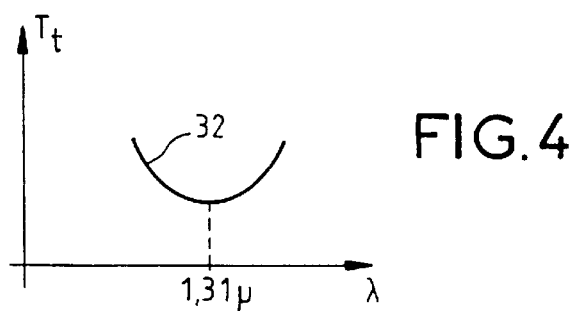
FIG. 4 is another diagram showing a step of a method of determining the chromatic dispersion of an optical fiber.

FIG. 4 shows the curve for the variation of the transit time Tt as a function of the wavelength. The curve 32 is substantially parabolic in shape, with a minimum at around 1.31 μm. There is therefore a wavelength $\lambda_0$ for which the chromatic dispersion is zero.

According to one aspect of the invention, which can be used with or without the method of making the measurements reliable, the chromatic dispersion is determined from measurements obtained using a reflectometer.

Either the emissivity data y (FIG. 3) or a transit time in the combination of the fibers A, 10 and B can be used.

If the data y is used (FIG. 3), the law relating the chromatic dispersion D at each wavelength to the differences $y_m-y_A$ at preselected wavelengths is determined beforehand. The dispersion D is then deduced from the measured values of $y_m-y_A$ at the preselected wavelength.

However, to avoid disturbing effects at the splices $S_A$ and $S_B$, the mean value $y_m$ of y over the section $30_F$ for the fiber to be characterized is considered between points $A'_1$ and $B'_1$ of the fiber 10 at a distance from the respective splices $S_A$ and $S_B$.

The mean value of y for the section $30_A$ is $y_A$, disregarding the area of the reference fiber close to the splice $S_A$.

Reflectometry is used to measure the differences $y_m - y_A$ at two wavelengths ($\lambda_1, \lambda_2$) or three wavelengths ($\lambda_1, \lambda_2, \lambda_3$), for example $\lambda_1 = 1.31$ $\mu$m, $\lambda_2 = 1.55$ $\mu$m and $\lambda_3 = 1.4$ $\mu$m, and the chromatic dispersion D at a given wavelength $\lambda$ is deduced using the following equation:

$$D(\lambda) = D_0(\lambda) + C_1(\lambda)(y_m - y_A)\lambda_1 + C_2(\lambda)(y_m - y_A)\lambda_2 + C_3(\lambda)(y_m - y_A)\lambda_3 \quad (3)$$

In the above equation, $D_0(\lambda)$, is substantially equal to the chromatic dispersion of the reference fiber A at the wavelength $\lambda$ and $C_1(\lambda)$, $C_2(\lambda)$ and $C_3(\lambda)$ are coefficients which depend on the wavelength $\lambda$. As indicated above, these coefficients are determined empirically.

The coefficients $C_1$, $C_2$ and $C_3$ are determined from a plurality of prior measurements on a significant number of fibers having characteristics similar to those to be characterized, in particular fibers from the same production line.

For example, the curves for chromatic dispersion as a function of wavelength are determined for around 100 optical fibers using standard transit time measuring systems. Reflectometry measurements on each fiber supply values $y_m - y_A$ at the wavelengths $\lambda_1$, $\lambda_2$ and $\lambda_3$. A standard linear regression program is then used to calculate coefficients $D_0$, $C_1$, $C_2$ and $C_3$ for each wavelength, previously measured using standard systems, from the chromatic dispersion data and the reflectometry data.

These values of $D_0$, $C_1$, $C_2$ and $C_3$ as a function of wavelength are stored in memory and enable the chromatic dispersion at various wavelengths of the fiber to be characterized, for example fiber from the same fabrication line, to be calculated quickly afterwards.

The second method of determining the chromatic dispersion starts from the observation that a reflectometer can measure the transit time in the combination of the fibers A, 10 and B. This is because it is possible to determine the end E of the curve 20 (FIG. 2a) since beyond the end E the results correspond to background noise of the reflectometer. As the measurements are reflectometer measurements, the data value at point E corresponds to twice the transit time.

To determine D, an optical length of the line formed by the fibers A, 10 and B is defined as follows:

$$L_{opt}(\lambda_i) = \frac{c}{2n_{ref}} T(\lambda_i) \quad (4)$$

In the above equation, c is the speed of light in vacuo, T is the round trip transit time in the fibers, $n_{ref}$ is the reference refractive index and $\lambda_i$ is the wavelength of the laser.

The process is as follows:

The optical lengths of the line are measured at all wavelengths $\lambda_i$ available in the reflectometer (two or three wavelengths).

The optical lengths of the reference fibers A and B are then subtracted from these lengths. The difference is denoted $L_{fopt}(\lambda_i)$:

$$L_{fopt(\lambda,i)} = L_{opt(\lambda,i)} - L_{0opt(\lambda,i)} \quad (5)$$

In the above equation, $L_{0opt}(\lambda_i)$ is the total optical length of the reference fibers A and B. This length is not determined on each measurement. It constitutes a parameter determined beforehand using N measurements, where N is equal to 100, for example. This value can nevertheless be updated periodically.

Note that the optical length $L_{0opt}(\lambda_i)$ can also include an additional length in the system 19.

The next step of the process consists in calculating the difference relative to a reference wavelength $\lambda_0$, for example 1.31 $\mu$m, using the equation:

$$x(\lambda i) = \frac{L_{fopt(\lambda i)} - L_{fopt(\lambda 0)}}{L_{fopt(\lambda 0)}} \quad (6)$$

The chromatic dispersion D at a wavelength $\lambda$ is then determined in a similar manner to that described above using equation (3), namely:

$$D(\lambda) = D'_0(\lambda) + \sum_i K_i(\lambda) \cdot x(\lambda i) \quad (7)$$

The coefficients $D'_0$ and $K_i$ are determined empirically in the same manner as described above for the coefficients $D_0$ and $C_i$ in equation (3).

To determine the optical length it is necessary to determine the position of the point E. A correlation method can be used for this which compares the aspect (signature) of the curve P to the expected signature at the point E.

What is claimed is:

1. A method of determining at least one characteristic of an optical fiber using a reflectometer, wherein the fiber to be characterized is connected at both ends to first and second reference fibers, respectively, comprising the steps of:

performing a first reflectometry measurement using the first reference fiber by connecting a free end of the first reference fiber to a first terminal of an optical switch of a system for generating laser pulses;

performing a second reflectometry measurement using the second reference fiber by connecting a free end of the second reference fiber to a second terminal of the optical switch of the system for generating laser pulses;

comparing a reflectometer data value at one point of the first reference fiber from the first reflectometry measurement to a reflectometer data value at one point of the second reference fiber from the second reflectometry measurement, wherein the one point of the first reference fiber is a first predetermined distance from an end of the first reference fiber that is connected to one of both ends of said fiber to be characterized, and the one point of the second reference fiber is a second predetermined distance from an end of the second reference fiber that is connected to the other of both ends of said fiber to be characterized, wherein the first predetermined distance is equal to the second predetermined distance; and retaining reflectometer data for said fiber to be characterized only if the data values are the same for both reflectometry measurements.

2. The method claimed in claim 1 wherein said reflectometer data values of the two reference fibers compared are mean values for equivalent segments of said reference fibers.

3. The method claimed in claim 1 wherein said reflectometer data values are obtained by adding the power detected during said first measurement to the power detected during said second measurement logarithmically for each abscissa, the length origins being the same for the two measurements.

4. The method claimed in claim 1 wherein said reference fibers have practically identical characteristics.

5. The method claimed in claim 3 wherein said reflectometer data values are used to determine the mode diameter of said fiber to be characterized.

6. The method claimed in claim 1 wherein said reflectometer data values are used to determine the chromatic dispersion of said optical fiber from reflectometer data obtained at two wavelengths at least.

7. The method claimed in claim 6 wherein said chromatic dispersion is obtained from the following equation:

$$D(\lambda) = C_0(\lambda) + \sum_i C_i(\lambda) \cdot x(\lambda i)$$

in which $D(\lambda)$ is the chromatic dispersion at the wavelength $\lambda$, $x(\lambda_i)$ is a reflectometer data value corresponding to measurements performed at a wavelength $\lambda_i$ and $C_0(\lambda)$ and $C_i(\lambda)$ are coefficients dependent on the wavelength $\lambda$.

8. The method claimed in claim 7 wherein the coefficients $C_0$ and $C_i$ are obtained empirically.

9. The method claimed in claim 8 wherein the coefficients $C_0$ and $C_i$ are obtained with the aid of a plurality of preliminary measurements effected on a series of fibers using a chromatic dispersion measuring system and with the aid of a reflectometer, the coefficients $C_0$ and $C_i$ being obtained thereafter by linear regression from said measurements.

10. The method claimed in claim 7 wherein:

$$x(\lambda_i)=(y_m-y_A)\lambda_i$$

in which equation $y_m$ is a mean value of the reflectometer data value at the wavelength $\lambda_i$ of said fiber to be characterized and $y_A$ is a mean value of the same reflectometer data values for a reference fiber at the same wavelength $\lambda_i$.

11. The method claimed in claim 7 wherein:

$$x(\lambda i) = \frac{L_{fopt(\lambda i)} - L_{fopt(\lambda 0)}}{L_{fopt(\lambda 0)}}$$

in which equation $\lambda_i$ is the measurement wavelength and $L_{opt(\lambda i)}$ is an optical wavelength such that:

$$L_{opt}(\lambda_i) = \frac{c}{2n_{ref}} T(\lambda_i)$$

$$L_{fopt(\lambda i)} = L_{opt(\lambda i)} - L_{0opt(\lambda i)}$$

where c is the speed of light, $n_{ref}$ is the reference refractive index of said fiber to be characterized, $T(\lambda_i)$ is the transit time, measured by reflectometry, corresponding to twice the transit time between one end of the reference fiber and the end of the other reference fiber, and $L_{0opt(\lambda i)}$ is the optical length of the reference fibers at said wavelength $\lambda_i$.

12. The method claimed in claim 11 wherein said transit time is determined by seeking a maximum correlation between the reflectometer signature observed for the end of the other fiber and the expected signature for that end.

13. The method claimed in claim 12 wherein the maximum correlation coefficient is sought in incremental reflectometer data between consecutive data points, preferably expressed on a linear scale.

* * * * *